United States Patent
Naito et al.

(10) Patent No.: US 9,691,553 B2
(45) Date of Patent: Jun. 27, 2017

(54) PRODUCTION METHOD FOR TUNGSTEN ANODE BODY

(71) Applicant: SHOWA DENKO K.K., Tokyo (JP)

(72) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/651,269

(22) PCT Filed: Sep. 27, 2013

(86) PCT No.: PCT/JP2013/076239
§ 371 (c)(1),
(2) Date: Jun. 11, 2015

(87) PCT Pub. No.: WO2014/091810
PCT Pub. Date: Jun. 19, 2014

(65) Prior Publication Data
US 2015/0310997 A1    Oct. 29, 2015

(30) Foreign Application Priority Data

Dec. 13, 2012  (JP) ................................ 2012-272584

(51) Int. Cl.
| | | |
|---|---|---|
| *H01G 9/052* | (2006.01) | |
| *B22F 3/12* | (2006.01) | |
| *B22F 7/02* | (2006.01) | |
| *B22F 9/04* | (2006.01) | |
| *C22C 1/00* | (2006.01) | |
| *C22C 32/00* | (2006.01) | |
| *H01G 9/15* | (2006.01) | |

(52) U.S. Cl.
CPC ............. *H01G 9/0525* (2013.01); *B22F 3/12* (2013.01); *B22F 7/02* (2013.01); *B22F 9/04* (2013.01); *C22C 1/00* (2013.01); *C22C 32/0078* (2013.01); *H01G 9/052* (2013.01); *B22F 2998/10* (2013.01); *B22F 2999/00* (2013.01); *H01G 9/15* (2013.01)

(58) Field of Classification Search
CPC . H01G 9/0525; B22F 3/12; B22F 9/04; B22F 7/02
See application file for complete search history.

(56) References Cited

U.S. PATENT DOCUMENTS

| | | | |
|---|---|---|---|
| 7,154,743 B2 | 12/2006 | Takatani et al. | |
| 2004/0200317 A1 | 10/2004 | Naito et al. | |
| 2013/0277626 A1* | 10/2013 | Naito | ............................ 252/515 |

FOREIGN PATENT DOCUMENTS

| | | |
|---|---|---|
| JP | 2003-272959 A | 9/2003 |
| JP | 2004-349658 A | 12/2004 |
| WO | 01/26123 A1 | 4/2001 |
| WO | 2004/055843 A1 | 7/2004 |
| WO | 2012/086272 A1 | 6/2012 |

OTHER PUBLICATIONS

International Search Report of PCT/JP2013/076239 dated Nov. 5, 2013.

* cited by examiner

*Primary Examiner* — Rebecca Lee
(74) *Attorney, Agent, or Firm* — Sughrue Mion, PLLC

(57) ABSTRACT

A method for producing an anode body in a capacitor, which includes making a molded body by molding a tungsten powder and making an anode body by sintering the molded body, which includes a step of bringing the tungsten powder or the molded body thereof into contact with a solution of a silicon compound before sintering the molded body so as to adjust the silicon content in the anode body to 0.05 to 7 mass %.

13 Claims, No Drawings

PRODUCTION METHOD FOR TUNGSTEN ANODE BODY

CROSS REFERENCE TO RELATED APPLICATIONS

This application is a National Stage of International Application No. PCT/JP2013/076239 filed Sep. 27, 2013, claiming priority based on Japanese Patent Application No. 2012-272584 filed Dec. 12, 2012, the contents of all of which are incorporated herein by reference in their entirety.

TECHNICAL FIELD

The present invention relates to a method for producing a tungsten anode body. Specifically, the present invention relates to a method for efficiently producing a tungsten anode body, at least a part of the surface of which contains tungsten silicide, suitable for producing an electrolytic capacitor element comprising a sintered body of tungsten powder as an anode body; a method for producing a capacitor using the anode body; and a method for producing a tungsten granulated powder used in the method for producing the anode body.

BACKGROUND ART

As an example of such an electrolytic capacitor, an electrolytic capacitor has been proposed, comprising as an anode body for a capacitor a sintered body made of a valve-acting metal powder such as tantalum which can be anodized.

The electrolytic capacitor using tungsten as a valve-acting metal and employing a sintered body of the tungsten powder as an anode body can attain a larger capacitance compared to the electrolytic capacitor obtained with the same formation voltage by employing an anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658; Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 (U.S. Pat. No. 7,154,743 B2)) discloses an electrolytic capacitor using an anode body selected from tantalum, niobium, titanium and tungsten, but it does not describe a specific example using tungsten.

As a tungsten powder which can solve the leakage current (LC) problem in the electrolytic capacitor using a sintered body of tungsten powder as an anode body, the present inventors have invented a tungsten powder, a part of the surface of which is made to be tungsten silicide so as to make the powder have a silicon content within a specific range (0.05 to 7 mass %) by mixing a tungsten powder with a silicon powder and heating the mixture under reduced pressure to thereby allow the mixture to react; an anode body for a capacitor made by sintering the powder; and an electrolytic capacitor using the anode body as an electrode, and filed a patent application (WO 2012/086272; Patent Document 4).

PRIOR ART

Patent Document

Patent Document 1: JP-A-2004-349658
Patent Document 2: JP-A-2003-272959
Patent Document 3: WO 2004/055843 (U.S. Pat. No. 7,154,743 B2)
Patent Document 4: WO 2012/086272

DISCLOSURE OF THE INVENTION

Problems to be Solved by the Invention

An object of the present invention is to provide a method for producing a tungsten anode body which enables the production of an electrolytic capacitor giving superior performance compared with the tungsten powder disclosed by Patent Document 4, a part of the surface of which is made to be tungsten silicide.

Means to Solve the Problem

The present inventors have found that a tungsten powder, in which tungsten silicide is more uniformly dispersed compared with the tungsten powder obtained by the method of Patent Document 4, can be obtained by a method comprising a step of bringing at least one of the tungsten powder and a molded body thereof into contact with a solution of a silicon compound, and the performance of the tungsten anode body obtained by sintering the powder is improved to thereby solve the above-mentioned problem, and have accomplished the present invention.

That is, the present invention relates to a method for producing an anode body in the following [1] to [11], a method for producing a capacitor in the following [12], and a method for producing a tungsten granulated powder in the following [13] to [16].

[1] A method for producing an anode body in a capacitor, comprising making a molded body by molding a tungsten powder and making an anode body by sintering the molded body, which comprises a step of bringing the tungsten powder or the molded body thereof into contact with a solution of a silicon compound before sintering the molded body so as to adjust the silicon content in the anode body to 0.05 to 7 mass %.

[2] The method for producing an anode body as described in [1] above, wherein the silicon content in the anode body is adjusted to 0.05 to 7 mass % by controlling the ratio of the solvent and the silicon compound in the solution of a silicon compound.

[3] The method for producing an anode body as described in [1] or [2] above, wherein bringing the tungsten powder into contact with the solution of a silicon compound is conducted by mixing the tungsten powder into the solution of a silicon compound.

[4] The method for producing an anode body as described in [1] or [2] above, wherein bringing the molded body into contact with the solution of a silicon compound is conducted by impregnating the molded body with the solution of a silicon compound.

[5] The method for producing an anode body as described in [1] above, wherein the process of bringing the tungsten powder or the molded body thereof into contact with the solution of a silicon compound is conducted as a process of making a molded body by molding the tungsten powder using a solution of a silicon compound containing a binder.

[6] The method for producing an anode body as described in any one of [1] to [5] above, wherein the solvent of the solution of a silicon compound is removed from the tungsten powder or the molded body thereof after the process of bringing the tungsten powder or molded body thereof into contact with the solution of a silicon compound.

[7] The method for producing an anode body as described in any one of [1] to [6] above, wherein the molded body is made by the calcination of the tungsten powder isolated from the solution of a silicon compound, pulverizing the powder to obtain a granulated powder, and molding the granulated powder after bringing the tungsten powder into contact with the solution of a silicon compound.

[8] The method for producing an anode body as described in any one of [1] to [7] above, wherein the silicon compound is a compound which is decomposed at a sintering temperature or lower, and at least part of the decomposed product reacts with tungsten to thereby form tungsten silicide.

[9] The method for producing an anode body as described in any one of [1] to [8] above, wherein the silicon compound is a silane compound.

[10] The method for producing an anode body as described in any one of [1] to [9] above, wherein the solvent of the solution of a silicon compound is one member selected from alcohol, ester and ether, or a mixed solvent of two or more thereof.

[11] The method for producing an anode body as described in any one of [1] to [10] above, further comprising a process of incorporating at least one element selected from nitrogen, carbon, boron, phosphorus and oxygen on at least a part of the surface of the sintered body.

[12] A method for producing a capacitor, which comprises as one electrode the anode body obtained by the method described in any one of [1] to [11] above and a counter electrode provided through the mediation of a dielectric body.

[13] A method for producing a tungsten granulated powder, comprising a process of bringing a raw material tungsten powder into contact with a solution of a silicon compound, and a process of pulverizing the tungsten powder after the calcination of the raw material tungsten powder treated with a solution of a silicon compound.

[14] The method for producing a tungsten granulated powder as described in [13] above, wherein the raw material tungsten powder is brought into contact with the solution of a silicon compound so as to adjust the silicon content in the granulated powder to 0.05 to 7 mass %.

[15] The method for producing a tungsten granulated powder as described in [14] above, wherein the silicon content in the granulated powder is adjusted to 0.05 to 7 mass % by controlling the ratio of the solvent and the silicon compound in the solution of a silicon compound.

[16] The method for producing a tungsten granulated powder as described in any one of [13] to [15] above, wherein bringing the tungsten powder into contact with the solution of a silicon compound is conducted by mixing the tungsten powder into the solution of a silicon compound.

Effects of the Invention

Use of the tungsten sintered body containing silicon obtained by method of the present invention as an anode body for a capacitor enables the production of an electric capacitor which has an equivalent or higher capacitance and good characteristics of LC per capacitance compared with a conventional tungsten sintered body.

MODE FOR CARRYING OUT THE INVENTION

The tungsten powder as a raw material for a tungsten sintered body (i.e. unprocessed tungsten powder) used in the present invention is commercially available, in which the lower limit of the average particle size is 0.5 μm. Generally, a tungsten powder having a smaller particle size is preferable because it enables the production of a sintered body (anode body) having a larger capacitance, if the volume of the anode body is the same. The tungsten powder having a smaller particle diameter than those of commercially available tungsten powder can be obtained by, for example, pulverizing the tungsten trioxide powder under hydrogen atmosphere; or reducing the tungsten acid and halogenated tungsten using a reducing agent such as hydrogen and sodium and appropriately selecting the reducing conditions.

Also, the tungsten powder can be obtained by reducing the tungsten-containing mineral directly or through several steps and by selecting the reducing conditions.

The tungsten powder having a still smaller particle diameter can be produced by a method of oxidizing the surface of the currently-available tungsten powder with an oxidizing agent (such as hydrogen peroxide and ammonium persulfate) to form an oxide film and removing the oxide film with an alkali solution, and the like.

The method for producing a tungsten anode body of the present invention comprises a process of bringing at least one of the tungsten powder or the molded body thereof into contact with a solution of a silicon compound before sintering the tungsten powder.

In a first embodiment of the production method of the present invention, after the calcination of the tungsten powder treated with a solution of a silicon compound under reduced pressure, the powder is pulverized.

As the silicon compound used in the present invention, it is preferable to use a silicon compound, which is soluble in an organic solvent such as alcohol, ester and ether, and is decomposed at a temperature of sintering the tungsten powder or lower, at least part of which compound reacts with tungsten to thereby form tungsten silicide. For example, a silane compound is preferable as a silicon compound. As a silane compound, preferred is a compound having a hydrolyzable group.

Examples of such a silicon compound include a silane compound represented by the following formulae (1) to (4).

$$Si(OR^1)(OR^2)(OR^3)(OR^4) \tag{1}$$

$$Si(OR^1)(OR^2)(OR^3)(OR^4)R^5 \tag{2}$$

$$Si(OR^1)(OR^2)R^5R^6 \tag{3}$$

$$Si(OR^1)R^5R^6R^7 \tag{4}$$

In the above formulae (1) to (4), $R^1$ to $R^7$ independently represent a hydrogen atom; alkyl group having 6 or less carbon atoms; mercapto group; cyano group; amino group; hydroxyl group; alkyl group having 6 or less carbon atoms substituted by at least one member selected from ester, halogen atom, alkene, alkyne and cycloalkane; phenyl group; ethylenyl group; or acyl group. Preferred are alkyl group having 6 or less carbon atoms and phenyl group.

Specific examples of such a compound includes the following.

1) $(CH_3)_2Si(OCH_3)_2$, $\phi_2Si(OCH_3)_2$ ($\phi$ represents phenyl group. The same shall apply hereafter.), $(CH_3)_2Si(OC_2H_5)_2$, $\phi_2Si(OC_2H_5)_2$,
2) $(CH_3)_2Si(OAc)_2$ (Ac represents acetyl group. The same shall apply hereafter.), and a polymer such as silicone resin as being a co-condensate of one or more kinds of these compounds,
3) compounds of $(CH_3)Si(OCH_3)_3$, $\phi Si(OCH_3)_3$, $(CH_3)Si(OC_2H_5)_3$, $\phi Si(OC_2H_5)_3$, $(CH_3)Si(OAc)_3$, $Cl(CH_2)_3Si(OCH_3)_3$, $(OCH_3)_3$, $HS(CH_2)_3Si(OCH_3)_3$, $NC(CH_2)_2Si(OCH_3)_3$, $H_2N(CH_2)_3Si(OC_2H_5)_3$, and a ladder silicone as being a co-condensate of one or more kinds of these compounds,
4) $Si(OCH_3)_4$, $Si(OC_2H_5)_4$, $Si(OAc)_4$ and $(CH_3)_3SiOCH=CH_2$ and a polymer thereof,
5) $(CH_3)_3SiO-CH=CH-CH_3$ and a polymer thereof,
6) $CH_2=CH(CH_3)_2SiOSi(CH_3)_2CH=CH_2$ and a polymer thereof,
7) $CH_2=Si(CH_3)_2OSi(CH_3)_2C=CH_2$ and a polymer thereof,
8) $(CH_3)_3SiOSi(CH_3)_3$, $H(CH_3)_2SiOSi(CH_3)_2H$, $ClCH_2(CH_3)_2SiOSi(CH_3)_2CH_2Cl$, $HOCH_2(CH_3)_2SiOSi(CH_3)_2CH_2OH$, $H_2N(CH_2)_3(CH_3)_2SiOSi(CH_3)_2(CH_2)_3NH_2$, $\phi_2Si(OH)_2$ and $(CH_3)_3SiOH$. These compounds can be used singly or in combination of two or more thereof.

If such a compound is liquid, it can be used as it is. However, since the compound is used in a smaller amount compared with the tungsten powder as described later, it is preferable to dissolve the compound in a solvent of alcohols such as methanol, ethanol, n-propyl alcohol and isopropanol; esters such as butyl acetate, propyl acetate and γ-butyrolactone; and ethers such as methyl ethyl ether, diethyl ether and furan to be used to come into contact with the tungsten powder in light of the dispersibility in the tungsten powder.

The silicon content in the anode body to be produced is 0.05 to 7 mass %, preferably 0.1 to 5 mass %, and still more preferably 0.2 to 5 mass %.

When the silicon content is less than 0.05 mass %, the powder is not capable of imparting good LC characteristics to the electrolytic capacitors in some cases. When the silicon content exceeds 7 mass %, the tungsten powder contains too much tungsten silicide and fails to form a dielectric layer well in some cases when an anode body for an electrolytic capacitor is obtained by molding the powder and is subjected to chemical formation, which is not desirable.

The silicon content in the anode body can be adjusted, for example, in the preliminary experiment. The silicon content in the anode body can be increased by increasing the concentration of the silicon compound in the solution or by decreasing the amount of the tungsten powder to the solution. The silicon content in the anode body can be decreased by the operations opposite to the above-mentioned operations. Since the silicon content in the tungsten is nearly unchanged before and after the calcination of the tungsten material, the silicon content in the anode body can be adjusted using the silicon content in the tungsten material before the calcination as an index. For example, the silicon content in the granulated powder as described later can also be adjusted to the above-mentioned range in a similar way.

In the present invention, after mixing the tungsten powder and a solution of a silicon compound by putting the tungsten powder in the solution of a silicon compound, followed by filtration of the solution, or by drizzling the tungsten powder with a solution of a silicon compound, the silicon powder can be calcined. The solvent can be removed in a vacuum dryer in advance before the calcination, or the process of removing the solvent in advance may be skipped and the solvent can be removed by the evaporation or decomposition during the elevating the temperature to the calcination temperature.

The temperature of the tungsten powder is returned to room temperature after the calcination, and the aggregated products are taken out and pulverized to obtain a granulated tungsten powder containing silicon. After the pulverization, fine powder and powder having a larger particle size may be removed by classification to adjust the particle diameter to a range suitable as a material for an anode body (to be described later). The removed powder can be recycled by sintering it alone or with other powders.

In the method of the present invention, at least part of silicon is combined with tungsten on the surface of the sintered body in the sintering process to thereby form tungsten silicide.

In the present invention, as a material tungsten powder to be treated with a solution of a silicon compound, one or more of the following powders can be arbitrarily selected and used other than the single-component tungsten powder: i.e. a tungsten powder, in which nitrogen is incorporated in part of the surface thereof; tungsten powders, in which at least one of carbon, boron, phosphorus and oxygen in addition to nitrogen is incorporated in part of the powder surface by carbonization, boronization, phosphorization and oxidation.

As an example of the method for incorporating nitrogen in part of the surface of tungsten powder, there is a method of placing the tungsten powder at 350 to 1,500° C. under reduced pressure and allowing the nitrogen gas (generally $10^3$ Pa or less) to pass through the powder for from several minutes to several hours at the time of lowering the temperature. The nitrogen content in the tungsten powder is 0.5 mass % or less, and it is desirable to adjust the nitrogen content in the anode body for a capacitor obtained by sintering the tungsten powder to preferably 0.01 to 0.5 mass %, more preferably 0.05 to 0.3 mass %.

As an example of the method for carbonizing part of the surface of the tungsten powder, there is a method of placing the tungsten powder at 300 to 1,500° C. in a high temperature vacuum furnace using carbon electrodes for from several minutes to several hours. It is preferable to perform the carbonization so as to make the carbon content to 0.001 to 0.5 mass % by selecting the temperature and period of time. When the nitrogen is allowed to pass in the furnace using carbon electrodes under predetermined conditions, the carbonization and incorporation of nitrogen occur simultaneously, which enables the production of the tungsten powder in which part of the surface is carbonized and nitrogen is incorporated in part of the surface.

As an example of the method for boronizing a part of the surface of the tungsten powder, there is a method of placing the boron element or a boron-containing compound as a boron source when granulating the tungsten powder. It is preferable to boronize the powder so as to have the boron content of 0.001 to 0.1 mass %. Good LC characteristics can be attained when the boron content is within the above-mentioned range. When a tungsten powder containing nitrogen is placed in the furnace using carbon electrodes and granulated with a boron source placed in the furnace, it enables the production of the tungsten powder in which nitrogen is incorporated in part of the surface and part of the surface is carbonized and boronized.

The phosphorus content of the tungsten powder of the present invention is preferably from 1 to 500 ppm by mass.

As an example of the methods for incorporating the phosphorus element in a tungsten powder or a tungsten powder which contained nitrogen in part of the surface and was further subjected to at least one of carbonization, boronization or oxidization, there is a method of producing the phosphorus-containing powder by placing phosphorus or a phosphorus compound as a phosphorous source in the high temperature vacuum furnace at the time of producing a material powder or a granulated powder of each tungsten powder. It is desirable to incorporate phosphorus in the tungsten powder so as to make the phosphorous content within the above-mentioned range by controlling the amount of the phosphorus source and the like because the physical breakdown strength of the anode bodies for a capacitor produced thereof can be improved in some cases. Better LC characteristics of an electrolytic capacitor produced thereof can be attained when the phosphorus content is within the above-mentioned range.

As a method for oxidizing part of the surface of the tungsten powder, there is a method of oxidizing the surface of a tungsten powder, or a tungsten powder which contains nitrogen in part of the surface and further subjected to at least one of carbonization and boronization. The oxygen content of the tungsten powder is preferably 0.05 to 8 mass %, and more preferably 0.08 to 1 mass %. Specifically, nitrogen gas containing oxygen is introduced at the time of taking out the powder from a high temperature vacuum furnace at the time of producing a material powder or a granulated powder of each powder. In this case, if the temperature at the time of taking out from the high temperature vacuum furnace is lower than 280° C., oxidation takes priority over the incorporation of nitrogen. By feeding the gas gradually, a predetermined oxygen content can be obtained. By making each of the tungsten powders have a predetermined oxygen content in advance, it is possible to reduce the deterioration due to the irregular excessive oxidation during the subsequent processes for producing an anode for a capacitor using the powder. Better LC characteristics of an electrolytic capacitor produced thereof can be attained when the oxygen content is within the above-mentioned range. In the case when the nitridation is not performed in this process, an inert gas such as argon and helium may be used instead of the nitrogen gas.

In the tungsten powder in which at least a part of the surface is silicified, it is preferable to keep the total content of impurity elements other than each element of silicon, nitrogen, carbon, boron, oxygen and phosphorous to 0.1 mass % or lower to attain better LC characteristics. In order to keep the content of these elements to the above-mentioned value or lower, the amount of the impurity elements contained in the raw materials, pulverizing member to be used, containers and the like should be closely examined.

In a second embodiment of the production method of the present invention, at least one of boronization, phosphorization, oxidation and incorporation of nitrogen can be performed by calcination of the granulated silicon-containing tungsten powder obtained by the method of the present invention with addition of at least one of a boron source, phosphorus source, oxide source and nitrogen source.

It is desirable to process the material tungsten powder (unprocessed powder) into a granulated powder having good flowability and operability for molding and the like. As described above, the tungsten powder may be brought into contact with a solution of a silicon compound during the process of granulation. The granulated tungsten powder may further be the one in which the fine pore distribution is adjusted in the manner similar to the method disclosed by JP-A-2003-213302.

The granulated powder can be obtained, for example, by adding at least one liquid such as water and liquid resin to the ungranulated tungsten powder so as to be made into the granules having an appropriate size; and sintering the granules by heating under reduced pressure. The reduced-pressure condition to obtain easy-to-use granulated granules (e.g. under non-oxidizing gas atmosphere such as hydrogen at 1 kPa or less) and the condition for allowing the granules to stand at a high temperature (e.g. 1,100° C. to 2,600° C., 0.1 hour to 100 hours) can be determined by a preliminary experiment. If there are no agglomerations of the granules with each other after the sintering, there is no need for pulverization.

It is desirable to classify the granulated powder through a sieve to adjust the particle size distribution before forming a molded body to be sintered and serve as a material of an anode body for a capacitor.

Such a granulated powder can be classified by a sieve to make each particle have a similar diameter. The average particle diameter within a range of preferably 50 to 200 µm, more preferably 100 to 200 µm, is favorable because the powder can smoothly flow from the hopper of the molding equipment to a mold when the powder is molded as an anode body for an electrolytic capacitor.

It is favorable to make the granulated powder so as to have a specific surface area (by BET method) of preferably 0.2 to 20 $m^2/g$, more preferably 1.5 to 20 $m^2/g$, because it can further increase the capacitance of the electrolytic capacitor.

Such a tungsten powder or a granulated powder is molded and sintered to be made into an anode body.

The sintering is conducted by obtaining a molded body by pressure forming of a tungsten powder and sintering the molded body in a furnace. A binder such as acrylic resin may be mixed in a material powder to facilitate the pressure forming. Various conditions such as an amount of the powder and molding equipment can be appropriately set to attain a desirable density of the molded body.

The tungsten powder may be brought into contact with a solution of a silicon compound by incorporating the above-mentioned binder in the solution of a silicon compound and by mixing the binder-containing solution of a silicon compound in the above-mentioned material powder.

The molded body may be brought into contact with a solution of a silicon compound by impregnating the molded body with the solution of a silicon compound.

The obtained sintered body as produced may be used as an anode body, but the sintered body may be further processed to be used as an anode body. The processing includes a chemical processing operation of incorporating an element such as nitrogen, carbon, boron, phosphorus and oxygen in the surface of the sintered body. The processing can be conducted in the same way as in the above-mentioned operation with respect to the tungsten powder.

Also, a physical processing such as connecting an anode lead wire to the obtained sintered body can be conducted. Such a processing may also be conducted before producing the sintered body.

An electrolytic capacitor is fabricated using an anode body for a capacitor comprising the sintered body of the tungsten powder manufactured by the method of the present invention as one electrode and a dielectric body interposed between the electrode and a counter electrode (cathode). A dielectric body is formed on the surface of an anode body (including the surface inside the pores) by, for example, electrolytic oxidation of the anode body. A counter electrode is formed by, for example, laminating a semiconductor layer such as a conductive polymer on the dielectric body.

EXAMPLES

The present invention is described below by referring to Examples and Comparative Examples, but the present invention is not limited thereto.

The measurement of the specific surface area and average particle diameter, the production of a sintered body, and the analysis of the elements other than tungsten (silicon, oxygen, nitrogen and other elements) of the granulated powder of Examples and Comparative Examples were conducted by the following methods.

Specific Surface Area:

The specific surface area was measured by the BET method by using Macsorb HM model-1208 (manufactured by Mountech Co., Ltd.).

Average Particle Diameter:

The particle diameter distribution was measured by the laser diffraction scattering method using HRA 9320-X100 manufactured by Microtrac Inc. A particle size value ($D_{50}$; μm) corresponding to cumulative volume % of 50 volume % was designated as the average particle diameter.

Production of a Sintered Body:

A molded body being 1.0×1.5×4.5 mm in size was produced by molding the granulated powder made in the examples. A tantalum wire of 0.29 mm in diameter stands upright in the 1.0×1.5 mm surface of the molded body, which is embedded 3.7 mm inside the molded body and protruded outside by 7 mm. The molded body was vacuum-sintered in a high-temperature vacuum furnace at a temperature described later for 20 minutes to obtain a sintered body of 60 mg in mass.

Measurement of the Each Content of Elements of Silicon, Oxygen and Other Elements:

Each content of the elements in the anode body was determined by ICP emission spectrometry. The nitrogen element content and oxygen element content were determined by the thermal conductivity detection and the infrared absorption method, respectively, using an oxygen/nitrogen elemental analyzer (TC600; manufactured by LECO Corporation).

Capacitance and LC Value of the Electrolytic Capacitor:

The anode body for a capacitor, which was composed of a sintered body of tungsten powder, was subjected to chemical conversion in an aqueous solution of 3 mass % of ammonium persulfate at 9 V for six hours, washed with alcohol and dried at 190° C. to form a dielectric layer on the surface of the anode body. The anode body having a dielectric layer formed thereon was immersed in an aqueous solution of 30% sulfuric acid to form an electrolytic capacitor, and the capacitance and LC value of the capacitor were measured. The capacitance was measured by using an LCR meter manufactured by Agilent Technologies, Inc. at room temperature, 120 Hz and bias voltage of 2.5 V. The LC value was measured 30 seconds after applying a voltage of 4 V at room temperature. Arbitrarily selected 40 pieces of the anode body in each example were measured and the average values were calculated.

Example 1

A tungsten powder (ungranulated powder) having an average particle diameter of 0.6 μm was obtained by reducing tungsten trioxide powder in the stream of hydrogen. After 100 g of the powder was put in 100 ml of ethanol solution of 0.5 mass % tetraethoxysilane and fully mixed, the mixture was put in a vacuum dryer to remove ethanol and be dried at 60° C.

Next, the resultant powder was calcined under vacuum condition of $5\times10^{-3}$ Pa at 1,400° C. for 20 minutes and cooled to room temperature. Subsequently, the powder was pulverized with a hammer mill to obtain a granulated powder having an average particle diameter of 110 μm (particle diameter distribution: 26 to 180 μm), a specific surface area of 0.3 m²/g and a silicon content of 0.05 mass %.

Examples 2 to 5, Comparative Examples 1 to 3

Granulated powders of Examples 2 to 5 and Comparative Examples 1 to 3 were produced in the same manner as in Example 1 except that the concentration of the above-mentioned tetraethoxysilane was changed as in Table 1 so as to make the silicon concentration (mass %) in the anode body fall within a range of 0 to 7.6%.

A molded body was formed by molding the granulated powder produced in each of the examples, and a sintered body was obtained by sintering the molded body. The measurement results of the silicon content and the oxygen content in the obtained sintered bodies are also shown in Table 1.

The granulated powder was analyzed by an X-ray diffractometer (X'pert PRO; manufactured by PANalytical B.V.), and tungsten silicide was detected as a reaction product. Most of the detected tungsten silicide was $W_5Si_3$. Sputtered surface of the granulated powder was also analyzed in a similar manner and it was found that tungsten silicide as a reaction product exists in a range within 30 nm in depth from the particle surface of the granulated powder. That is, it was confirmed that silicon exists as tungsten silicide in at least a part of the surface layer of the particles of the granulated powder. Although these values are the results of the analysis of the granulated powder, the granulated powders show similar results when they are processed into an anode body.

A molded body was formed by molding the granulated powder produced in each of the examples, and a sintered body was obtained by sintering the molded body at 1,550° C. in a high-temperature vacuum furnace. The capacitance and LC value of the electrolytic capacitor using the obtained sintered body as an anode body were measured and the results are also shown in Table 1.

TABLE 1

| | Sintered body | | Anode body | |
|---|---|---|---|---|
| | Silicon content (mass %) | Content of other principal element (ppm by mass) | Capacitance (μF) | LC (μA) |
| Example 1 | 0.05 | Oxygen 5,800 | 294 | 3.6 |
| Example 2 | 0.2 | Oxygen 6,700 | 310 | 0.5 |
| Example 3 | 1.1 | Oxygen 7,500 | 303 | 0.5 |
| Example 4 | 4.4 | Oxygen 8,400 | 308 | 0.7 |
| Example 5 | 6.3 | Oxygen 9,200 | 313 | 3.9 |
| Comparative Example 1 | 0.03 | Oxygen 6,100 | 288 | 46 |

TABLE 1-continued

| | Sintered body | | Anode body | |
|---|---|---|---|---|
| | Silicon content (mass %) | Content of other principal element (ppm by mass) | Capacitance (μF) | LC (μA) |
| Comparative Example 2 | 7.6 | Oxygen 9,600 | 311 | 22 |
| Comparative Example 3 | 0.0 | Oxygen 5,200 | 282 | 91 |

Example 6

200 g of commercially-available tungsten powder (ungranulated powder) having an average particle diameter of 0.5 μm was put in 400 g of water, in which 10 mass % of ammonium persulfate was dissolved, and the water was fully stirred with a homogenizer to oxidize the surface layer of the tungsten powder. After washing with water, 500 ml of 2N aqueous sodium hydroxide solution was added thereto and the resultant solution was stirred to thereby remove the oxide on the surface layer. A series of operations of the oxidation and removal of the oxide was repeated three times to obtain a finely-powdered tungsten powder having an average particle diameter of 0.3 μm was obtained. 100 g of the powder was put in 100 ml of ethanol solution of 0.5 mass % of dimethyldimethoxysilane and fully mixed. Then, the solution was placed in a vacuum dryer to remove ethanol and be dried at 60° C.

Next, the resultant powder was calcined under vacuum condition of 5×10⁻³ Pa at 1,370° C. for 20 minutes and cooled to room temperature. Subsequently, the powder was pulverized with a hammer mill to obtain a granulated powder having an average particle diameter of 105 μm (particle diameter distribution: 20 to 180 μm), a specific surface area of 2.1 m²/g and a silicon content of 0.1 mass %.

Examples 7 to 10, Comparative Examples 4 to 6

By changing the concentration of the above-mentioned dimethyldimethoxysilane as in Table 2, granulated powders of Examples 7 to 10 and Comparative Examples 4 to 6 were produced so as to make the silicon concentration (mass %) in the anode body fall within a range of 0 to 8.2%.

A sintered body was produced from the granulated powder of each of the examples. The measurement results of each content of silicon, oxygen and nitrogen in the obtained sintered bodies are also shown in Table 2.

A molded body was formed by molding the granulated powder produced in each of the examples, and a sintered body was obtained by sintering the molded body at 1,500° C. in a high-temperature vacuum furnace. The capacitance and LC value of the electrolytic capacitor using the obtained sintered body as an anode body were measured and the results are also shown in Table 2.

TABLE 2

| | Sintered body | | Anode body | |
|---|---|---|---|---|
| | Silicon content (mass %) | Content of other principal element (ppm by mass) | Capacitance (μF) | LC (μA) |
| Example 6 | 0.1 | Oxygen 7,700 Nitrogen 710 | 767 | 4.4 |
| Example 7 | 0.3 | Oxygen 8,500 Nitrogen 680 | 772 | 0.7 |
| Example 8 | 1.4 | Oxygen 9,400 Nitrogen 620 | 774 | 0.8 |
| Example 9 | 4.8 | Oxygen 11,500 Nitrogen 550 | 785 | 0.8 |
| Example 10 | 7.0 | Oxygen 12,700 Nitrogen 800 | 789 | 4.1 |
| Comparative Example 4 | 0.01 | Oxygen 7,400 Nitrogen 720 | 772 | 63 |
| Comparative Example 5 | 8.2 | Oxygen 13,400 Nitrogen 800 | 746 | 30 |
| Comparative Example 6 | 0.0 | Oxygen 6,700 Nitrogen 840 | 741 | 126 |

Example 11

A finely-powdered tungsten powder having an average particle diameter of 0.1 μm was obtained by repeating a series of operations of the oxidation and removal of the oxide six times in the same way as in Example 6. A granulated powder having a silicon content of 0.3 mass % was produced in the same way as in Example 6 except that triethoxyphenylsilane was used instead of dimethyldimethoxysilane and the calcination temperature was set to 1,320° C. After putting 80 g of the granulated powder in 200 ml of an aqueous phosphoric acid solution to be mixed, the solution was vacuum-dried at 100° C. and the water was removed. Subsequently, resintering at 1,320° C. for 20 minutes was conducted and the powder was cooled to room temperature and pulverized with a hammer mill to obtain a granulated powder having an average particle diameter of 93 μm (particle diameter distribution: 20 to 160 μm) and a specific surface area of 10.3 m²/g. The sintered body made of the granulated powder contained 0.3 mass % of silicon, 14,700 ppm by mass of oxygen, 890 ppm by mass of nitrogen and 70 ppm by mass of phosphorus as in Table 3.

Comparative Example 7

A granulated powder was obtained in the same way as in Example 11 except that a silicon compound (triethoxyphenylsilane) was not added. Silicon was not detected in the sintered body made of the granulated powder and the sintered body contained 11,900 ppm by mass of oxygen, 850 ppm by mass of nitrogen and 70 ppm by mass of phosphorus as in Table 3.

Comparative Examples 8 to 10

A dispersion of a silicon powder was prepared in the same way as in Example 3 and Example 8 except that instead of a silicon compound, a commercially-available silicon powder (average particle diameter of 1.5 μm) was added to ethanol, and a tungsten powder and the dispersion were mixed. A granulated powder was prepared in the same way as in Example 3 (calcination temperature: 1,400° C.) and Example 8 (sintering temperature: 1,370° C.) except that a solution of a silicon compound was changed to a dispersion of silicon powder. The sintered body made of the granulated powder of Comparative Example 8 had a silicon concentration of 1.0 mass % and an oxygen concentration of 6,400 ppm by mass and the granulated powder of Comparative Example 9 had a silicon concentration of 1.5 mass %, an oxygen concentration of 9,300 ppm by mass and a nitrogen concentration of 710 ppm by mass as shown in Table 3.

The granulated powder of Comparative Example 10 was produced under the conditions of Example 3 and a dispersion of silicon dioxide prepared by adding a silicon dioxide powder having an average particle diameter of 1 μm to ethanol so as to adjust the concentration to 1 mass % was used instead of the ethanol solution of tetraethoxysilane, and the tungsten powder was mixed with the dispersion. A granulated powder was obtained in the same way as in Example 3 except that a solution of a silicon compound was changed to a dispersion of silicon dioxide powder. The granulated powder had a silicon concentration of 1.0 mass % and an oxygen concentration of 12,200 ppm by mass as shown in Table 3. Further, it was confirmed that silicon dioxide exists in isolation between the particles of the tungsten powder by the observation under a scanning electron microscope (SEM) and the energy dispersive spectrometry (EDS), and that the silicon dioxide is in a crystalline state by the X-ray diffractometry. In the granulated powder, a compound of tungsten and silicon was not observed.

A molded body was formed by molding the granulated powder produced in each of Example 11 and Comparative Examples 7 to 10, and a sintered body was obtained by sintering the molded body in a high-temperature vacuum furnace at a temperature as shown in Table 3. The capacitance and LC value of the electrolytic capacitor using the obtained sintered body as an anode body were measured and the results are also shown in Table 3.

TABLE 3

|  | Sintered body | | | Production of a sintered body | Anode body | |
| --- | --- | --- | --- | --- | --- | --- |
|  | Silicon content (mass %) | Content of other principal element (ppm by mass) | | Sintering temperature (° C.) | Capacitance (μF) | LC (μA) |
| Example 11 | 0.3 | Oxygen 14,700 | Nitrogen 890 | Phosphorus 70 | 1,460 | 1,860 | 1.3 |
| Comparative Example 7 | 0.0 | Oxygen 11,900 | Nitrogen 850 | Phosphorus 70 | 1,460 | 1,948 | 307 |
| Comparative Example 8 | 1.0 | Oxygen 6,400 | | | 1,550 | 305 | 5.8 |
| Comparative Example 9 | 1.5 | Oxygen 9,300 | Nitrogen 710 | | 1,500 | 768 | 7.9 |
| Comparative Example 10 | 1.0 | Oxygen 12,200 | | | 1,550 | 296 | 103 |

The capacitance and LC values shown in Tables 1 to 3 are an average value of arbitrarily-selected 40 units of anode bodies in each of Examples and Comparative Examples, and the element contents are an average value of arbitrarily-selected two pieces of sintered bodies in each of Examples and Comparative Examples. In any of Examples and Comparative Examples, there was no granulated powder in which the total content of the elements other than tungsten, silicon, oxygen, nitrogen and phosphorus exceeded 1,000 ppm.

The invention claimed is:

1. A method for producing an anode body in a capacitor, comprising making a molded body by molding a tungsten powder
and making an anode body by sintering the molded body, which comprises a step of bringing the tungsten powder or the molded body thereof into contact with a solution of a silicon compound before sintering the molded body so as to adjust the silicon content in the anode body to 0.05 to 7 mass %, and
wherein the solution of a silicon compound is a solution comprising the silicon compound and a solvent in which the silicon compound is dissolved.

2. The method for producing an anode body as claimed in claim 1, wherein the silicon content in the anode body is adjusted to 0.05 to 7 mass % by controlling the ratio of the solvent and the silicon compound in the solution of a silicon compound.

3. The method for producing an anode body as claimed in claim 1, wherein bringing the tungsten powder into contact with the solution of a silicon compound is conducted by mixing the tungsten powder into the solution of a silicon compound.

4. The method for producing an anode body as claimed in claim 1, wherein bringing the molded body into contact with the solution of a silicon compound is conducted by impregnating the molded body with the solution of a silicon compound.

5. The method for producing an anode body as claimed in claim 1, wherein the process of bringing the tungsten powder or the molded body thereof into contact with the solution of a silicon compound is conducted as a process of making a molded body by molding the tungsten powder using a solution of a silicon compound containing a binder.

6. The method for producing an anode body as claimed in claim 1, wherein the solvent of the solution of a silicon compound is removed from the tungsten powder or the molded body thereof after the process of bringing the tungsten powder or molded body thereof into contact with the solution of a silicon compound.

7. The method for producing an anode body as claimed in claim 1, wherein the silicon compound is a compound which is decomposed at a sintering temperature or lower, and at least part of the decomposed product reacts with tungsten to thereby form tungsten silicide.

8. The method for producing an anode body as claimed in claim 1, wherein the silicon compound is a silane compound.

9. The method for producing an anode body as claimed in claim 1, wherein the solvent of the solution of a silicon compound is one member selected from alcohol, ester and ether, or a mixed solvent of two or more thereof.

10. The method for producing an anode body as claimed in claim 1, further comprising a process of incorporating at least one element selected from nitrogen, carbon, boron, phosphorus and oxygen on at least a part of the surface of the sintered body.

11. The method for producing an anode body as claimed in claim 1, wherein at least part of silicon constituting the silicon compound is combined with tungsten on the surface of the sintered body in the sintering step to thereby form tungsten silicide.

12. A method for producing an anode body in a capacitor,
comprising making a molded body by molding a tungsten powder
and making an anode body by sintering the molded body,
which comprises bringing the tungsten powder into contact with a solution of a silicon compound before sintering the molded body so as to adjust the silicon content in the anode body to 0.05 to 7 mass %, isolating the tungsten powder from the solution of a silicon compound, calcining the isolated tungsten powder, pulverizing the calcined powder to obtain a granulated powder and molding the granulated powder,
wherein the solution of a silicon compound is a solution comprising the silicon compound and a solvent in which the silicon compound is dissolved.

13. The method for producing an anode body as claimed in claim 12, wherein at least part of silicon constituting the silicon compound is combined with tungsten on the surface of the sintered body in the sintering step to thereby form tungsten silicide.

\* \* \* \* \*